Jan. 1, 1957  A. CHATELAIN  2,775,791
PROCESS FOR MAKING CAST TILE, BLOCK OR THE LIKE
Filed Sept. 12, 1950  2 Sheets-Sheet 2
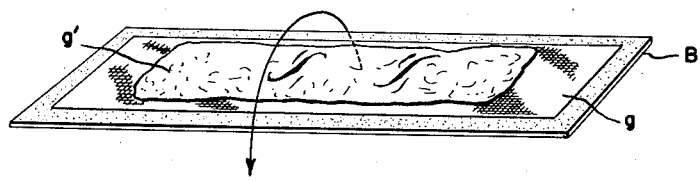
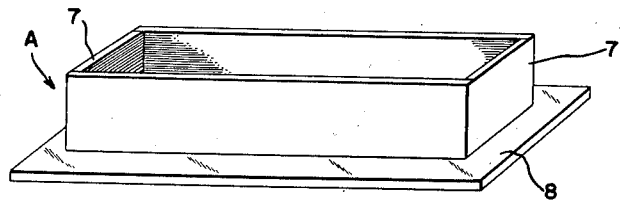
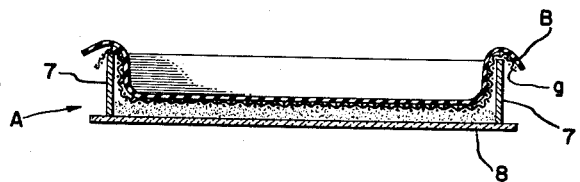
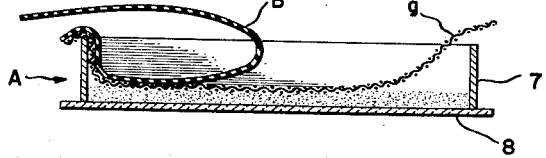
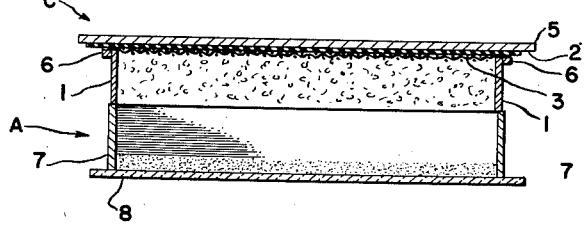
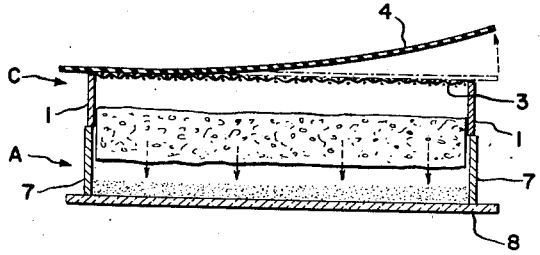
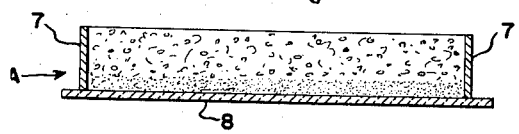
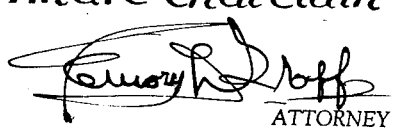
INVENTOR
Andre Chatelain
BY
ATTORNEY

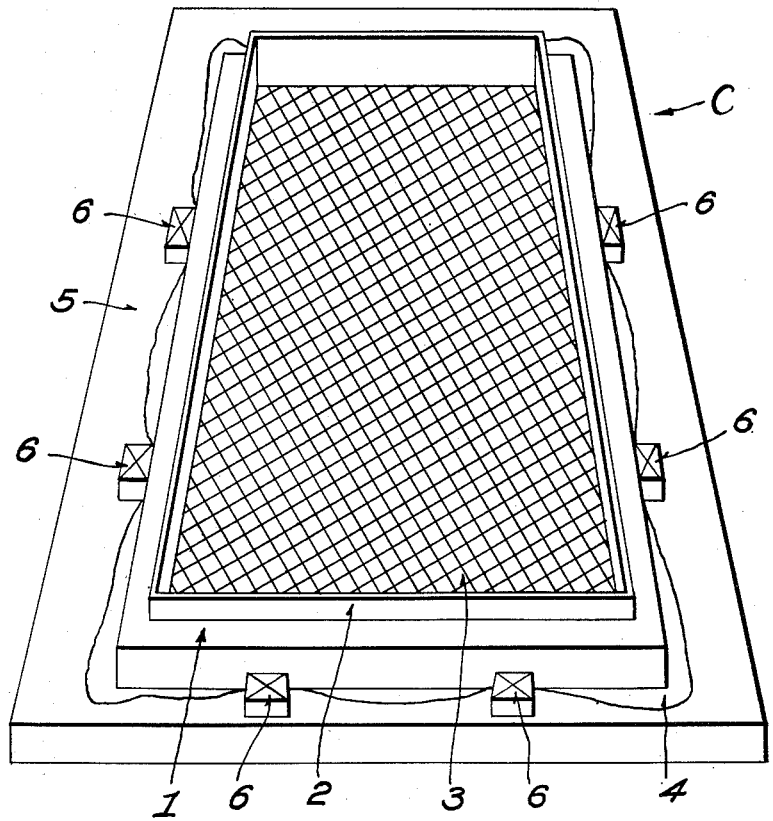

United States Patent Office 2,775,791
Patented Jan. 1, 1957

2,775,791

PROCESS FOR MAKING CAST TILE, BLOCK OR THE LIKE

André Châtelain, Ecublens, Switzerland

Application September 12, 1950, Serial No. 184,425

Claims priority, application Switzerland October 28, 1949

4 Claims. (Cl. 18—47.5)

The present invention relates to a method of making a cast member in the nature of a block or equivalent geometrical figure which may have the shape of a tile, slab, etc. of greatly varying dimensions, and having several faces or sides at least one of which faces is smooth, hard, and shiny on at least part of its surface and is impregnated with a waterproofing compound.

A distinctive feature of the invention resides in providing a product of the type described with an exposed surface layer composed principally of a mixture of cement, chalk, and casein poured onto an impervious face of a mold to produce the aforesaid hard shiny or polished surface, which surface may be subjected to such ornamental treatment as desired. That is to say the invention also relates to a process for making a cast member which permits the reproduction, on at least one of the dressed faces of the pieces to be cast, of designs, motifs, lettering, etc., and, also, the setting in the mold of the mortar which constitutes the major part of the mass.

Figure 1 is a perspective view of a form used in carrying out the second step of the process.

Figure 2 shows a combination of a wire netting and a flexible sheet used in a preliminary step.

Figures 3, 4 and 5 are views of a mold functioning during successive steps of the process.

Figure 6 shows the mold of Figures 3, 4 and 5 and the form C inverted to empty its material into the mold.

Figure 7 shows the mortar dropping from form C into mold A.

Figure 8 shows the mortar setting in the mold.

The following is an example of the method to be practiced in producing a cast article, such as a tile, slab, etc., according to the invention.

A mold with a glass bottom and of a size corresponding to that of the object to be produced is used to receive a surface coating or layer which is made by mixing, for example, two parts of cement, one part of powdered chalk, and a small amount of casein with water. This coating is spread over the bottom of the mold so that the latter will be completely covered. Subsequently, there is prepared a mortar composed, for example, of 40 parts of cement, 54 parts of sand, 5 parts of powdered chalk, and one part of casein which is then poured on the surface coating in the desired amount and allowed to harden.

After removal from the mold, the face of the tile in contact with the glass is shiny. This face dries rapidly so that it is then ready for a second operation which consists in placing the tile in such a position that its shiny face will be exposed. A piece of cloth, of the same surface area as the tile, is soaked with cellulose varnish and applied to the face, having the surface coating referred to. To prevent excessively rapid drying of the varnish and permit it to thoroughly penetrate into the surface coating of the tile, a second tile, cast in the same manner as the first, may be placed on the piece of cloth with the tile's polished side facing the cloth. The two tiles would thus be treated simultaneously. After a certain time, 30 minutes, for instance, the piece of cloth is withdrawn and the excess waterproofing material wiped off, by means of a wiper made of a flat rubber strip, for example. The manufacture of the tiles would thus be completed.

The mold may also have several faces made of glass whenever several shiny sides are to be produced. It goes without saying that, instead of glass, any other hard material could be used as long as it is impervious, smooth and stable, in contact with the surface coating.

To obtain dressings with varied effects, different materials may be added to the surface coating, in the nature of a filler, such as sand, particles of rock, of glass, or of metal, mineral fibers, glass wool etc. The product resulting from the incorporation in the surface coating of one or several of these filler materials makes it possible to obtain either all, or part, of the mass necessary to the manufacture of thin plates, for example.

Uniform coloring may be obtained by adding a dye to the surface coating. With two or more colored or differently shaded coatings, various decorative effects, such as imitations of polished stone, of marble, etc. may be obtained by mechanical means. With a colored surface coating it is also possible to produce designs, letters, words, names, numerals, etc. on a polished face of the mold and fill the free spaces with coatings in contrasting colors. Thus one can produce substances suitable for use as signs, advertising boards, and the like.

In keeping with this idea, certain parts of the slab's polished face which has not yet been waterproofed may be treated with acid so as to represent any desired design. The parts thus treated will become dull and will remain so after having been waterproofed. This process is particularly suitable for bringing out symbols, names, or words on advertising boards, etc.

When drying, the polished or shiny face of the cast substance becomes very absorbent and permits the penetration of different dyes which, applied either by brush or by printing, may represent designs, paintings, letters, or other symbols. Waterproofing will fix them permanently in the substance.

In the composition of the mortar, which generally constitutes the principal mass of the cast substance, the sand may be replaced, wholly or in part, by stone fragments or other materials so as to impart strength to the mortar. Once in the mold, the mortar may, in turn, be covered with ordinary mortar made of cement and a filler material. This latter mortar may be placed first in a form comprising, for an example, a piece of sheet metal of which two outer and opposite sections are bent with respect to a bottom section to form opposite walls, while two removable pieces of wood or metal contribute the two other opposite walls. That form has the appearance of a tray. The mortar is placed in the form and well packed therein. Then one of the removable walls is removed and the formed block of mortar is displaced from the form bottom by pushing it with the remaining movable wall into the mold to cover the facing material placed therein.

It is obvious that, during the molding process, concrete blocks of any desired shape and in different stages of hardening may be superimposed on the mortar or directly on the surface layer.

Instead of cellulose varnish, zapon varnish, or Celluloid varnish, for instance, one may also use a synthetic varnish or a solution of liquid silicate or of fluosilicate. To render the casein or the salts formed as a result of the occurring reactions perfectly insoluble, a small amount of formalin may be added to the waterproofing agent, for example about 10 cc. per liter of waterproofing agent.

The piece of fabric used for impregnation may be replaced by a piece of any other absorbent material such as a sponge, artificial fiber, foam rubber, etc.

To manufacture cast articles that are decorated on at least one of their dressed or polished faces, the following process may be used the same employing two devices, namely: a first device consisting of a sheet of rubber on which is spread a piece of slightly moist linen or other fabric, and a second device consisting of a form the construction of which is shown in perspective and by way of example in Figure 1 of the accompanying drawing.

The process is applied, for example, to the manufacture of a slab showing on its dressed face white veins on a black background. To this end, one prepares two surface coatings, one of which is black, the other white, each composed mainly of cement, chalk, dye, casein, and a filler material. For example, to obtain the effect, a linen cloth, in the shape of a narrow strip, having the dimensions conforming to those of the mold and to the design to be reproduced may be used. This strip is placed on a sheet of rubber of the same size. The black coating is poured on this linen cloth. This is followed by the pouring of a stripe of white material of desired length and width. By means of a small instrument, such as a spatula, the stripe of white material may be spread more or less; it may be broken at one or more places; it may be divided into branches, or else be concentrated in a single straight line. The sheet of rubber is then grasped by two of its ends and the whole thing turned over on the glass bottom of the main mold at the spot intended to imitate a white area on a black background. The rubber sheet which adheres but very little to the linen cloth is now withdrawn. Next, the linen cloth is removed. This can be done without disturbing the design. Thus a part of the surface of the glass bottom is covered with a stripe of black coating contrasting with a vein of white color. This is the layer that will constitute the dressed side of the slab to be produced.

The next operating step is effected with the aid of a second operating device, which, according to the embodiment shown in Fig. 1 of the drawing, comprises a form C composed of a frame 1 the inner wall 2 of which consists of a band-type framing projecting a few millimeters beyond the upper edge of frame 1 and the bottom of which is covered with a wire gauze 3 under which is stretched a sheet 4 of flexible material, of rubber, rubberized cloth, or other plastic material, for instance. The frame with the wire gauze 3 and flexible sheet 4 is mounted on a supporting plate 5. The latter is provided with pins or stops 6 so as to hold the form on the supporting plate.

This second device thus serves to carry out the operation above described by the application, in the mold and without disturbing the achieved design, of a second layer of mortar, or, if desired, of successive layers, on the initial layer. This step is expressive of one of the fine points of the process. In fact the mortar adheres to the flexible sheet constituting the bottom of the mortar support and will not drop although it is inserted above and lowered into the mold. If held sufficiently long in this position, it might drop partly or non-uniformly. Yet there is ample time for adjusting the mortar support in the right position on the mold before lifting the flexible sheet. This is made possible by the wire-netting to which the mortar clings. When the adhesion of the mortar to the wire netting is sufficiently diminished, the mortar drops slowly down on the coating. Obviously the shape and capacity of the mortar support is controlled by the mortar needed to fill up the mold. This is made possible by the raised edges of inner wall 2 of the frame, and the supporting plate 5 is immediately withdrawn. This is followed by the removal of sheet 4 of flexible material to which the mortar adhered and from which it is separated by wire gauze 3. The adherence to the wire gauze and to the narrow walls of the form frame being very slight, the mortar comes loose in a block to fall on the first layer of which it will become an integral part.

It is obvious that instead of using a flexible cloth for effecting the ornamental motifs, these could be produced also by other means as has already been mentioned in connection with the first form of execution.

Depending on the size of the piece to be cast, the form may be used once or several times. For instance, to make a slab of a certain length, the form may be filled several times and turned over into the mold on the dressed-face layer by juxtaposing the mortar masses. If the slab to be produced is very thick, the masses of mortar may be superimposed and metal reinforcements inserted between them. After having imparted to the mortar a certain thickness by means of the form, a wire netting or iron reinforcement is placed on the mortar. The filling of the mold is then continued by using the said form.

The use of the first device of operation described above serves to produce different motifs such as the imitation of veins in rocks or wood, lettering, numerals, signs, etc.

If necessary, the material is applied by means of the form not only on the bottom of the mold but also against other smooth walls for the purpose of continuing the motif on the sides of the piece being cast.

To obtain certain decorative effects, the form may also be used in the following manner: The form is filled partly with mortar and one or more dressed-face layers are spread over this mortar to form the desired motif. The form is then turned over directly on the empty mold, and one proceeds as explained above to cause the mass to go down in the mold.

The cast substance produced by the manufacturing processes described or by their combination may also serve for applications other than those mentioned above. They may be used, for instance, as tables, supporting shelves or brackets, framing blocks for doors and windows, wall coverings and floorings, tombstones, signs, boards, plates, etc.

To manufacture cast articles that are decorated on at least one of their dressed and polished faces there is used a mold A, Figures 3–8, a piece of wire netting g, Figure 2, also, a flexible sheet B, and a form C, Figure 1. The mold A in its most general shape is constituted by a metallic frame 7 secured on a sheet of glass 8. The form C (Figure 1) is composed of a frame 1, the inner surfaces 2 of which are constituted by band-type framing projecting a few millimeters above the upper surface of frame 1 and the bottom of which is covered with a wire netting 3 beneath which is a sheet 4 of flexible material, rubber for instance. The frame with the wire net and flexible sheet is mounted on a supporting plate 5. The latter is provided with pins or stops 6 to secure the form against lateral displacement on the supporting plate.

Another differently colored paste is also prepared. A moistened piece of wire netting g is spread on a flexible sheet B. One of the pastes of different colors is poured on the wire netting g as indicated at g' Figure 2 in such a way that it will spread in a layer having approximately the area of the bottom of mold A. A stripe of the second paste is then poured on the first layer in a design desired for reproduction. By means of a small tool, the second paste stripe is operated on and corrected to properly bring out the desired effect. The lines of the design may be widened or divided into branches or broken. The flexible sheet B is then grasped by two opposite ends and with its charge inverted above the mold so that the coating surface with the design will contact the glass of the mold at the correct place. The coating mass resting on a smooth surface adheres thereto strongly. The flexible sheet is separated from the wire netting and the latter can be easily removed by lifting one of its ends. Thus in the mold is a layer that will constitute the dressed side of the slab to be produced.

The next step in the operation is carried out with the aid of form C. Mortar is prepared for instance with one part of cement and two parts of sand. The form is filled with well-packed mortar. The filled form is inverted above mold A in a position to be received by the mold A. This is made possible by the upstanding flanges of the inner wall 2 of the frame and the supporting plate 5 is immediately withdrawn. This is followed by the removal of sheet 4 of flexible material to which the wet mortar particles passing through the wire netting adhered firmly. When removing the flexible sheet, the block of mortar having lost its adhesion at its upper side gets loose, slides along the narrow sides of the form and drops gently on the first layer of which it will become an integral part. After the mass has set and hardened, the unit removed from the mold is treated for waterproofing.

I claim:

1. A method for producing a cast member of synthetic stone material consisting in mixing two parts of cement, one part of powdered chalk, a small amount of casein with water, stirring the mixture obtained to produce a semi-fluid paste, laying a piece of wire netting over a sheet of flexible material, spreading the semi-fluid paste over said piece of wire netting to form a layer thereon, associating with said layer at least one other paste of similar composition and of a different color to form with the first paste an ornamental design, inverting the paste-carrying wire netting and sheet above a main mold provided with at least one inner smooth and polished wall to make the lower surface of the paste engage said wall, removing the flexible sheet and piece of wire netting while leaving the paste inside the mold, filling with mortar an auxiliary mold the bottom of which is constituted by a piece of wire netting and a sheet of flexible material, inverting said auxiliary mold above the main mold to drop the mortar onto the above-mentioned layer in said main mold, removing the last mentioned sheet of flexible material to reduce the adhesion between the mortar and the wire netting and to prevent the mortar sliding over the paste from disturbing the ornamental design formed by the latter, and allowing the mortar to set with the underlying paste, lifting the unit out of its mold, allowing it to harden and waterproofing it.

2. A method for producing a cast unit forming an artificial stone with a polished surface, consisting in laying a piece of moist wire netting on a sheet of flexible impervious material, casting over said piece of fabric a mass of semi-fluid mortar, forming on the surface of said mass an ornamental design by means of coloring material, then inverting said mass, coloring material, wire netting and sheet above the inner smooth and polished walls of a mold, to make the ornamental design engage said walls of the mold without any substantial deformation of said design, removing the sheet of flexible material, removing the piece of wire netting, lifting the unit formed by the set mass from the mold, leaving the lifted unit to harden and applying to the surface thereof carrying the design a soluble waterproofing fluosilicate.

3. A method for producing a cast unit forming an artificial stone with a polished surface, consisting in laying a piece of moist wire netting on a sheet of flexible impervious material, casting over said piece of wire netting a mass of semi-fluid mortar, forming on the surface of said mass an ornamental design by means of coloring material, then inverting said mass over the inner smooth and polished walls of a mold, to make the ornamental design engage said walls of the mold without any substantial deformation of said design, removing the sheet of flexible material, removing the piece of wire netting, lifting the unit formed by the set mass, leaving the lifted unit to harden, dulling by an acid at least part of the polished design-carrying surfaces that were previously in contact with the mold walls and waterproofing said surfaces.

4. A method for producing an artificial stone unit having a cement base, consisting in filling partly with mortar an auxiliary mold, casting over said mortar a semi-fluid paste layer containing a substantial proportion of pulverulent chalk, producing an ornamental design of light color at the surface of said layer, then inverting the contents of the auxiliary mold above a smooth-bottomed slightly larger mold, removing the bottom of the auxiliary mold to make the mass on the latter slide into the larger mold with its design-carrying surface engaging the smooth bottom of the mold, allowing the unit to set, lifting it, leaving it to dry and impregnating the absorbent design-carrying surface with solutions of coloring material over areas selected in accordance with a predetermined pattern and waterproofing said design-carrying surface.

References Cited in the file of this patent

UNITED STATES PATENTS

| Number | Name | Date |
|---|---|---|
| Re. 1,676 | Derburgh | May 17, 1864 |
| 419,655 | Gesner | Jan. 21, 1890 |
| 635,005 | Summers | Oct. 17, 1899 |
| 664,194 | Uhlig | Dec. 18, 1900 |
| 880,753 | Payne et al. | Mar. 3, 1908 |
| 985,353 | Landis | Feb. 28, 1911 |
| 1,126,853 | Peterson | Feb. 2, 1915 |
| 1,204,378 | Spencer | Feb. 7, 1916 |
| 1,211,632 | Shaw et al. | Jan. 9, 1917 |
| 1,265,438 | Dolyak | May 7, 1918 |
| 1,560,450 | Wesely | Nov. 3, 1925 |
| 1,569,977 | Hatch | Jan. 19, 1926 |
| 1,570,538 | Thomas | Jan. 19, 1926 |
| 1,637,946 | Knofe | Aug. 2, 1927 |
| 1,935,985 | Oherherr | Nov. 21, 1933 |
| 2,018,192 | Sexton | Oct. 22, 1935 |
| 2,132,257 | Duskey | Oct. 4, 1938 |
| 2,213,023 | Beck et al. | Aug. 27, 1940 |
| 2,513,972 | Stitt | July 4, 1950 |